2 Sheets—Sheet 1.

D. B. LORING.
Machine for Making Horseshoe-Nails.

No. 203,282. Patented May 7, 1878.

Witnesses;
W. J. Cambridge
J. E. Cambridge

Inventor,
David B. Loring,
Teschemacher & Stearns,
Attorneys.

2 Sheets—Sheet 2.
D. B. LORING.
Machine for Making Horseshoe-Nails.
No. 203,282. Patented May 7, 1878.
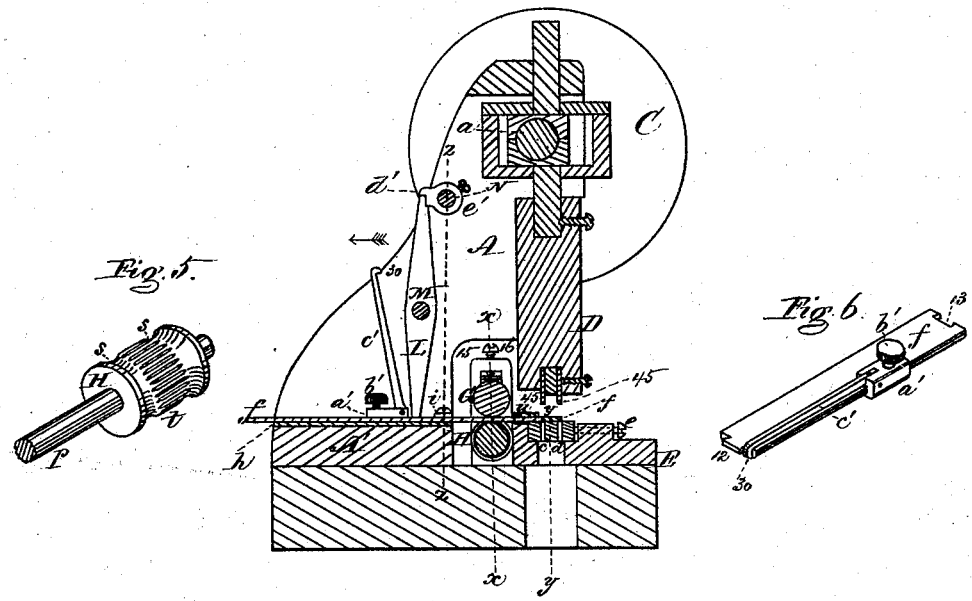
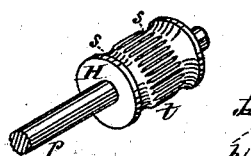
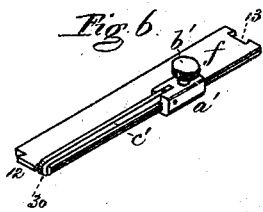
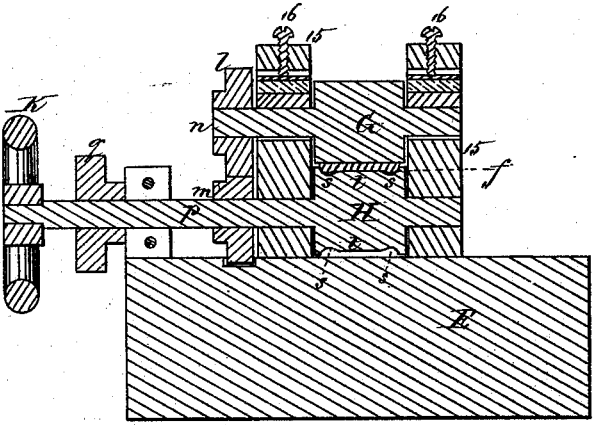
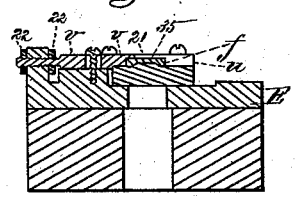
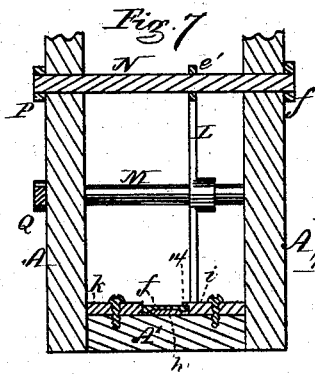
Witnesses:
W. J. Cambridge
J. E. Cambridge
Inventor,
David B. Loring,
per
A. Teschemacher & Stearns,
Attorneys.

UNITED STATES PATENT OFFICE.

DAVID B. LORING, OF BOSTON, MASSACHUSETTS.

IMPROVEMENT IN MACHINES FOR MAKING HORSESHOE-NAILS.

Specification forming part of Letters Patent No. 203,282, dated May 7, 1878; application filed March 16, 1878.

*To all whom it may concern:*

Be it known that I, DAVID B. LORING, of Boston, in the county of Suffolk and State of Massachusetts, have invented certain Improvements in Machines for Making Horseshoe-Nails, of which the following is a full, clear, and exact description, reference being had to the accompanying drawings, making part of this specification, in which—

Figure 1:
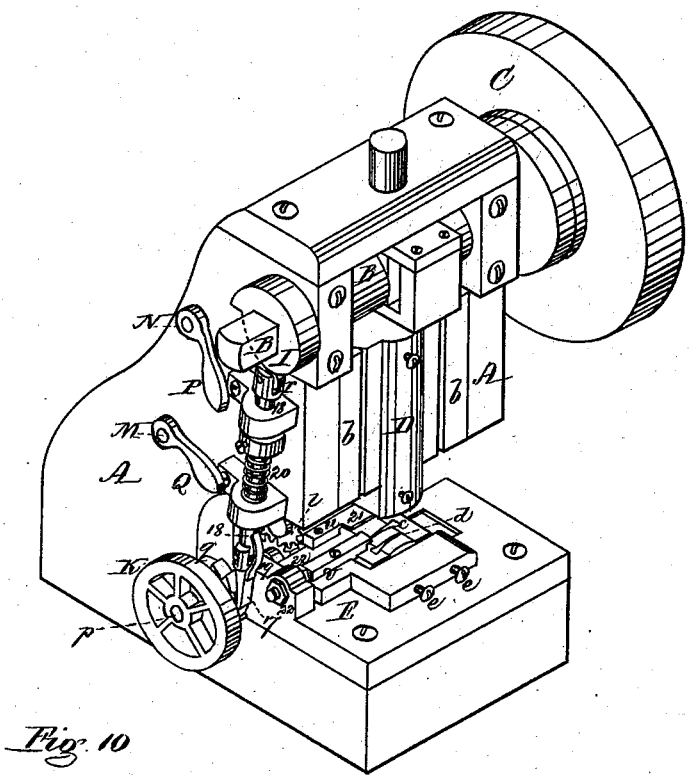
Figure 11:
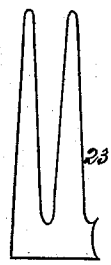
Figure 10:
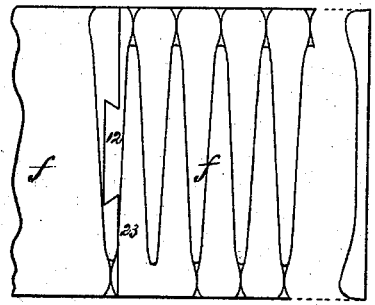
Figure 8:
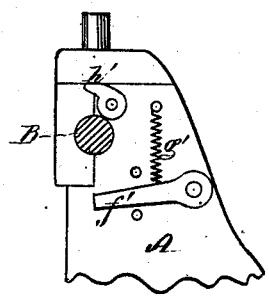
Figure 9:
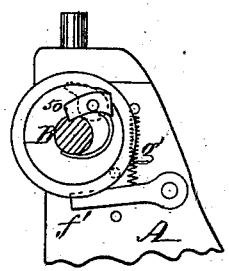

Figure 1 is a perspective view of a machine for making horseshoe-nails constructed in accordance with my invention. Fig. 2 is a longitudinal vertical section through the center of the same. Fig. 3 is a transverse section, enlarged, on the line $x\ x$ of Fig. 2. Fig. 4 is a section on the line $y\ y$ of Fig. 2; Fig. 5, view, enlarged, of the lower feed-roll detached; Fig. 6, view of the nail-plate, with its dog and gage attached thereto. Fig. 7 is a section on the line $z\ z$ of Fig. 2, looking in the direction of the arrow; Figs. 8 and 9, sectional details. Fig. 10 represents the nail-plate, enlarged, marked off on the lines at which it will be cut to form nails. Fig. 11 represents the waste-piece left at the end of each plate.

This invention relates to that class of horseshoe-nail machines in which the nails are cut by suitable punches and dies from a long strip or plate, provided at each edge with a rib or flange, which forms the head of the nail; and my invention consists in constructing one of the feed-rolls of the pair by which the nail-plate is carried forward with a central roughened portion, having on each side a groove for the reception of the corresponding rib of the plate, these grooves being of greater depth than the ribs, and serving to guide and steady the plate in its passage through the rolls, and effectually prevent it from moving laterally with relation to the dies, while the roughened portion of the roll prevents any liability of slip, and insures the positive feed of the plate the exact distance required at each forward movement of the rolls.

My invention also consists in an adjustable stripper or clearer, arranged at one side of the line of feed, and projecting out over one edge of the plate between the two dies, (also serves as a guide,) in combination with a stripper or clearer, extending across the width of the nail-plate, immediately behind the first punch, these clearers serving to prevent the plate from being lifted by the punches as they ascend.

My invention also consists in a dog, which is clamped onto the nail-plate, and is provided with a gage for accurately determining its distance from the front end of the plate, the dog, as the plate is fed forward, being brought into contact with and operating a mechanism for stopping the machine, the position of this dog being such as to effect this stoppage when the connection between two plates has been severed in the operation of cutting the blanks, whereby an opportunity is afforded for removing the waste end of the plate, and the injury which would result from the contact of the dies therewith avoided.

To enable others skilled in the art to understand and use my invention, I will proceed to describe the manner in which I have carried it out.

In the said drawings, A represents the framework in bearings, in the upper portion of which is located the main shaft B, revolved by power applied to a driving-pulley, C, on one of its ends. The central portion of this shaft, between its bearings, is provided with a crank, $a$, which is suitably connected with the upper end of the vertical punch-carrier D, which slides in guides $b$ in the frame A, this carrier being provided with removable punches 45, adapted to enter dies $c\ d$ of the die-block, secured immovably upon the bed E by set-screws $e$, these dies being arranged with their heads and points alternating, as shown, the punches matching exactly with and driving the nails cut from the plate $f$ down through the die-openings.

The plate $f$, Figs. 6 and 10, from which the nail-blanks are cut, may be of any brand of iron or steel suitable for horseshoe-nails, (that known as homogeneous metal being preferred,) and is rolled with a rib or flange at each edge, the width of the plate being equal to the length of the nail-blank cut therefrom plus the length of the head of the blank.

Each of these plates, which may be of any desired length, is provided at one end with a dovetail projection, 12, and at the other end with a correspondingly-shaped notch, 13, the projection of one plate fitting into the notch of the next one, a ready and convenient means being thus afforded for passing the plates through the machine in an uninterrupted line.

The plate $f$ to be fed forward is placed upon a guide-rail, $h$, rising from the center of a table, A', the front of which is provided with two guides, $i\ k$, opposite each other, between which the plate passes; one, $i$, having a lip, 14, which projects over the edge of the plate and holds it squarely in position, and prevents it from being raised sufficiently to disconnect it from the plate behind it, the guide-rail fitting into the groove or channel between the ribs.

G H are the feed-rolls, placed in line with the prolongation of the center of the guide-rail $h$, the lower roll H revolving in fixed bearings, while the boxes of the upper roll are placed within slots in the housings 15, and are free to yield slightly against the resistance of springs placed above them, the pressure of the upper roll being regulated by means of set-screws 16.

The feed-rolls are caused to revolve together at the same speed by means of gears $l\ m$ on their shafts $n\ p$, the shaft $p$ of the lower roll being prolonged and provided with a ratchet-wheel, $q$, with which engages a pawl, 17, pivoted to the lower end of a sliding rod, 18, and held up to the teeth of the ratchet-wheel by a spring, 19.

The upper end of the rod is provided with a friction-roll, $r$, which is held up by a spring, 20, against the under surface of a cam, I, on the main shaft B; and thus as this cam is revolved the rod is reciprocated, causing the pawl 17 to intermittingly rotate the feed-rolls G H, as desired, the distance between the teeth of the ratchet-wheel being such as to cause the nail-plate to be fed forward the exact amount required after each operation of the punches.

At the extremity of the shaft of the lower feed-roll is a hand-wheel, K, by means of which the rolls can be rotated by hand, if required.

As the nail-plate $f$ enters between the rolls G H with its channeled side underneath, the upper feed-roll G is made of the same diameter throughout its length, and with a plane surface, to conform to that of the plate in contact therewith, while the lower roll H is constructed with a deep groove, $s$, Fig. 5, near each end, for the reception of the corresponding rib on the under side of the plate, which fits therein, as seen in Fig. 3, the central portion $t$ of this roll H between these grooves being made slightly crowning, or of other form, to adapt it to the form of the channel in the under side of the plate. This portion $t$ of the roll is provided with a series of long V-shaped teeth, parallel to each other and slightly inclined to the axis of the roll.

These teeth take hold of and insure the positive feed of the plate the exact distance required at each forward movement of the rolls, all liability of slip being thereby avoided.

This portion $t$ of the roll H, instead of being provided with long teeth, may be serrated, or roughened in any other suitable manner.

It will be seen that the ribs of the plate $f$ snugly fit the outer edges of the grooves $s$ in the roll H, these grooves thus serving as guides to effectually prevent any tendency of the plate to move laterally out of position with respect to the dies, thus insuring perfect work, and dispensing with some of the auxiliary guides heretofore employed.

Immediately in front of the rolls is secured a stationary bar, $u$, the under side of the central portion of which is cut away, so as to form a rectilinear aperture, 35, in line with the space between the rolls, and of a size sufficient to allow of the passage of the plate, this aperture serving as a guide for that portion of the nail-plate in front of the rolls.

At the top of the central portion of this bar $u$, immediately over the aperture 35, is a projecting lip, 21, which extends up to the line of the first punch, and forms a stripper or clearer, for preventing the nail-plate from being lifted by the punches in their ascent, whereby the liability of the punches being broken, and the end of one plate becoming disengaged from the one following it, is avoided.

To the side of the bed E, and extending over the die-block between the dies $c\ d$, is secured a narrow bar, $v$, made adjustable in the direction of its length by means of screw-nuts 22, this bar serving as a guide, against which the edge of the advancing plate bears, whereby the position of the latter is accurately gaged with respect to the dies, so that the descending punches will cut quite up to the line of the edge of the plate, as is necessary to produce perfect work.

The upper portion of the front of this guide-bar projects out over the edge of the plate, forming a lip, which serves the office of a stripper or clearer, to keep the plate firmly on the bed, and allow the ascending punches to clear themselves without lifting or moving the edge of the nail-plate, and the two strippers 21 and $v$ thus serve to effectually prevent the front nail-plate from being raised out of its proper position and disconnected from the plate behind it in case the dovetail-connection should be in advance of the bite of the rolls.

These strippers do not exert a pressure upon the upper surface of the nail-plate, but merely serve to prevent the plate from being lifted and displaced by the punches, which are liable to adhere thereto.

As soon as the first punch has cut through the dovetail connection between two nail-plates, a waste-piece, 23, Fig. 11, is left loose upon the die-block, which, if allowed to remain thereon, would be liable to produce injury to the edges of the punches by crowding them to one side, and thus necessitate re-grinding.

The motion of the machine is, therefore, automatically arrested when the connection between two nail-plates has been severed, in order to allow of the removal of this waste-piece.

The stoppage of the machine is accomplished in the following manner: $a'$ is a dog, which is adapted to fit over the edge of the nail-plate, to which it is clamped by a binding-screw, $b'$. This dog is applied to each plate before it is united with the one in front, and is provided with a pivoted arm, $c'$, having a hook, 30, at its extremity, which drops over the edge of the nail-plate, as seen in Fig. 6, a gage being thus formed which enables the operator to always apply the dog to the plate at a predetermined distance from its front end. After the dog $a'$ has been secured in place the gage $c'$ is thrown up out of the way, as seen in Fig. 2, so as to allow the plate to be joined to the one in front of it, which is done while the machine is in operation.

The distance of the dog $a'$ from the front end of the plate, as determined by the gage $c'$, is such that it will meet and trip a lever, L, when the dovetail-connection between two nail-plates has been severed by the first punch.

The upper end of the lever L, which is firmly secured to a horizontal rock-shaft, M, fits under a projection, $d'$, on a collar, $e'$, secured to a horizontal rock-shaft, N, which carries at one end, outside the frame-work, an arm, $f'$, which, when the end of the lever L is withdrawn from under the projection $d'$ of the collar $e'$ by the contact of the dog $a'$, is drawn up by a spring, $g'$, into a position to be struck by a toe, $h'$, connected with a clutch, 50, within the pulley C, which is thus disengaged, when the pulley is free to revolve upon the main shaft, and the motion of the machine is arrested, the relative position of the parts being such that this stoppage of the machine is not effected until the punch-carrier has completed its ascent after the connection between two plates has been severed, thus affording free access to the die-block, to enable the operator to remove the waste-piece of metal lying thereon. As soon as this has been done the shaft N is moved by means of the hand-lever P until the projection $d'$ catches over the end of the lever L, which causes the end of the arm $f'$ to be withdrawn against the resistance of the spring $g'$ out of the path of the toe $h'$ of the clutch 50, which is then thrown by a spring into a notch, causing the pulley and the shaft to revolve together, the machine being thus set in motion, when the operation of punching out the blanks continues, as before. The rock-shaft M is provided with a hand-lever, Q, by means of which the upper end of the lever L can be withdrawn from under the projection $d'$, in order to stop the machine whenever it may be found necessary. Any suitable clutch mechanism adapted to be operated by the dog $a'$ on the nail-plate may be employed for connecting the pulley C with the main shaft.

The blanks produced in the above-described machine are afterward finished, by being drawn cold and pointed, in machines adapted for the purpose.

I am aware that adjustable gages or guides used in connection with a clearer are shown in Patent No. 187,808, granted R. M. Cady on the 27th of February, 1877; and also that devices for similar purposes are shown in Patent No. 145,336, granted H. D. Cowles, December 9, 1873. I therefore lay no claim to such devices when constructed and located as shown and described by them, and confine myself to the guide or clearer $v$ and bar $u$, with its clearer 21, to the precise construction and arrangement herein set forth.

What I claim as my invention, and desire to secure by Letters Patent, is—

1. In a machine for making horseshoe-nails, the combination of the plane-surfaced feed-roll G with the feed-roll H, provided with a central roughened portion, $t$, and two grooves, $s$ $s$, for the reception of the ribs or flanges of the nail-plate passing between the rolls, but of greater depth than the thickness of said ribs, whereby the plate is fed forward positively, and also prevented from moving laterally with relation to the dies, substantially as described.

2. The adjustable guide and clearer $v$, arranged at one side of the line of feed and projecting out over the edge of the nail-plate between the dies, in combination with the bar $u$ and its clearer 21, substantially as and for the purpose set forth.

3. The dog $a'$, with its gage $c'$ and clamp $b'$, attached to the nail-plate $f$, in combination with a mechanism to be operated by the dog for stopping the machine when the connecting-joint between two nail-plates has been severed by the punch, substantially as described.

4. The rock-shaft N, with its catch or projection $d'$ and arm $f'$, for disengaging the clutch mechanism of the pulley C, in combination with the tripping-lever L and dog $a'$ on the nail-plate $f$, substantially as set forth.

Witness my hand this 13th day of March, A. D. 1878.

DAVID B. LORING.

In presence of—
P. E. TESCHEMACHER,
N. W. STEARNS.